US005899358A

United States Patent [19]

Daumueller

[11] Patent Number: 5,899,358

[45] Date of Patent: May 4, 1999

[54] DEVICE FOR DISPENSING CYLINDRICAL OBJECTS

[75] Inventor: Thomas Daumueller, Leinfelden-E., Germany

[73] Assignee: HESS SB-Automatenbau GmbH, Magstadt, Germany

[21] Appl. No.: 08/871,833

[22] Filed: Jun. 9, 1997

[30] Foreign Application Priority Data

Jun. 10, 1996 [DE] Germany .......................... 296 09 900

[51] Int. Cl.$^{6}$ .................................................... B65G 59/00

[52] U.S. Cl. .................................. 221/196; 221/2; 221/6; 221/202; 221/266; 221/286; 221/197

[58] Field of Search ................................... 221/196, 202, 221/203, 266, 62, 286, 197

[56] References Cited

U.S. PATENT DOCUMENTS

| | | | |
|---|---|---|---|
| 494,162 | 7/1893 | Thie | 221/196 |
| 827,890 | 8/1906 | Sobolewski | 221/266 |
| 1,058,317 | 4/1913 | McGill | 221/202 |
| 2,655,418 | 10/1953 | Oetding | 621/281 |
| 3,161,321 | 12/1964 | Mellion | 221/266 |
| 3,587,922 | 6/1971 | Oeiti | 221/249 |
| 3,749,280 | 7/1973 | Gale | 221/67 |
| 3,880,320 | 4/1975 | Morello et al. | 221/266 |
| 4,308,974 | 1/1982 | Jones | 221/196 |
| 4,869,375 | 9/1989 | Rubbmark | 221/131 |
| 5,240,143 | 8/1993 | Kornegay | 221/281 |
| 5,310,082 | 5/1994 | Coustenoble | 221/287 |
| 5,611,456 | 3/1997 | Rasper | 221/195 |

FOREIGN PATENT DOCUMENTS

| | | | |
|---|---|---|---|
| 990617 | 9/1951 | France | 221/196 |
| 369083 | 9/1921 | Germany . | |
| 9002363 | 5/1990 | Germany . | |
| 4143276 | 7/1993 | Germany . | |
| 9508817 | 3/1995 | WIPO . | |

*Primary Examiner*—H. Grant Skaggs
*Attorney, Agent, or Firm*—Paul Vincent

[57] ABSTRACT

The invention concerns an apparatus for dispensing cylindrical objects, the apparatus having a dispensing device comprising a device housing having a dispensing opening, a storage magazine disposed within the device housing for storing the objects, and a dispensing drum rotatably borne in the device housing and having a recess for accepting the objects, the recess communicating with the storage magazine and the dispensing opening. The drum has an axis of rotation substantially parallel to a longitudinal axis of the objects, and teeth disposed at the recess to push objects seating on the drum away from the drum. The apparatus is particularly well-suited for dispensing rolls of coins without damage to same and without jamming.

16 Claims, 8 Drawing Sheets

DEVICE FOR DISPENSING CYLINDRICAL OBJECTS

BACKGROUND OF THE INVENTION

The invention concerns a device for dispensing cylindrical objects, in particular rolls of coins, having a storage magazine for the objects and with at least one rotatably mounted at least partially drum-shaped dispensing device for receiving the objects which leads to a dispensing opening, wherein the axis of the drum is substantially parallel to the axis of the objects and the dispensing drum has at least one recess for accepting at least one of the objects.

A dispensing device of this type for rolls of coins is e.g. known in the art from G 90 02 363.3.

The device for dispensing rolls of coins known in the art through G 90 02 363.3 stores the rolls of coins which are to be dispensed and introduces one roll of coins at a time via a dispensing device to a dispensing opening.

Under certain circumstances, rolls of coins proximate to the dispensing drum opening in the storage magazine can become jammed in such a fashion that it is no longer possible for a roll of coins to gain entrance into the recess for dispensing to a user. This leads to an error message in the machine for dispensing rolls of coins.

It is therefore the purpose of the invention to create a device of the above mentioned kind whose susceptibility to failure when dispensing the stored objects is reduced.

SUMMARY OF THE INVENTION

This purpose is achieved in accordance with the invention in that the dispensing drum has teeth located above and/or below its recess which push away the objects seating on the dispensing drum.

The size of the teeth depend on the geometry of the objects to be dispensed. The teeth cause the objects which are to be dispensed to move e.g. during the dispensing process so that acceptance of the objects from the storage magazine into the dispensing drum is substantially simplified. In addition, an appropriate sensing means can be utilized to monitor the processing motion during passage of the objects from the storage magazine into the dispensing drum as well as during dispensing out of the dispensing opening, to substantially shorten the dispensing times and substantially improve the reliability of the system.

In a preferred embodiment, the teeth extend along the entire axial length of the dispensing drum parallel to the drum axis. This has the advantage that motion of the drum leads to easier rolling of the objects over another. Towards this end the teeth cause the objects being dispensed to freely roll on another in the front region of the storage magazine to simplify acceptance of an object into the dispensing drum.

The above mentioned purpose is achieved in a second aspect of the invention in that a sensor is located in the storage magazine and/or in the opening in the dispensing drum to determine whether or not the storage magazine or the opening is filled.

These sensors facilitate determination and monitoring of the instantaneous filling state reigning in the storage magazine. The sensor disposed in the recess facilitates nearly immediate stoppage of the upward motion during reception of an object into the recess of the dispensing drum and starting of a downward motion towards the dispensing opening.

In a particularly preferred embodiment, a microswitch activator projects into the recess. When the dispensing drum is set into oscillating motion by means of a suitable driving mechanism, one of the objects to be dispensed gains entrance into the recess and thereby activates the microswitch located therein. Same, for its part, facilitates nearly instantaneous stoppage of the upward motion of the dispensing drum and starting of its downwards motion towards the dispensing opening.

In a further preferred embodiment, a microswitch activator projects above a floor of the storage magazine, the floor being preferentially slanted in a downward direction toward the dispensing drum. Since the recess in the dispensing drum is preferentially located in the vicinity of a lower edge of the storage magazine, with the slanted floor causing a persistent rolling of the objects, the roll of coins located directly in front of the recess gains entrance therein. Along the path to the dispensing drum the e.g. rolls of coins to be dispensed roll over and operate the microswitch and activator (empty switch). Same is preferentially not disposed directly at the lower edge of the slanted floor, rather somewhat upward therefrom and within the storage magazine. In this manner one guarantees that, in the event that a customer requests that the machine dispense a large number of rolls of coins, this large number is then properly dispensed without having the machine execute an alternative payment with e.g. other rolls from perhaps a second dispensing device due to an empty state signal of this microswitch.

In addition to these advantages, the microswitch located in the dispensing drum and the empty switch located on the slanted floor provide for the additional possibility of determining and monitoring the instantaneous state of the storage volume. In this fashion, when the empty switch indicates a filled condition and the microswitch is not activated, it is possible to move the dispensing drum upwardly and downwardly a plurality of times until an object rolls into the recess of the dispensing drum to activate the microswitch. In addition, these sensors facilitate recognition of possible jamming of the objects which can then be freed by a forward and backward running drive motor.

The invention also concerns a device for dispensing cylindrical objects, in particular rolls of coins, wherein the dispensing device is borne on a pull-out carrier.

A dispensing device of this kind for rolls of coins has likewise become known in the art through G 90 02 363.3.

The device known in the art from G 90 02 363.3 has a supporting rail configuration on its lower side which does not permit the device to be moved in a forward direction over a previously positioned stationary removal tray for the dispensed objects. This conventional dispensing device can therefore only be used in machines which are to be filled from the back.

In contrast thereto it is the additional purpose of the invention to improve the device of the above mentioned kind in such a fashion that filling of same can be done in a simple and straight forward fashion from the front.

This purpose is achieved in accordance with the invention in that the upper side of the dispensing device has a pull-out carrier disposed on the upper side of the dispensing device which is preferentially borne in a ball bearing, the pull-out carrier having pull-out rails which are stationary and by means of which same can be pulled-out in a forward direction through an opened front door of the machine. By means of the pull-out rails, which can be disposed on an intermediate floor within the machine housing, the dispensing device can be pulled out in a forward direction for filling purposes or for purposes of maintenance.

A particularly advantageous embodiment of this dispensing device in accordance with the invention is characterized in that a removal tray for accepting the dispensed objects comprises a stationary part and a part pivotable along with the door of the apparatus. When the machine is filled, one part of the removal tray remains in the machine housing, whereas the other part is pivoted along with the opened machine door.

In a preferred embodiment of each of the above mentioned devices, a sensor is disposed between the dispensing drum and the output opening, in particular a light barrier for recognizing dispensing of an object across the dispensing opening. This light barrier is located below the dispensing drum but nevertheless within the dispensing device. The light barrier positioned at this location has the advantage of allowing confirmation of the signal provided by the microswitch in the recess of the dispensing drum for recognition of piling-up of objects which have not been removed from the removal tray and also for promptly recognizing and signaling unauthorized access from the outside. This is necessary in order to recognize and to prevent vandalism especially in dispensing machines for rolls of coins which are accessible from the front.

In a further improved embodiment, a sensor, preferentially a light barrier, is disposed above the removal tray provided for reception of the dispensed objects. The light barrier illuminates the removal tray over its entire width so that unauthorized access is recognized to facilitate appropriate measures such as locking and the like.

It is also particularly advantageous for an access blocker to be located above the removal tray which protects the devices in the machine from unauthorized access while also guaranteeing that a customer does not become injured by the moving mechanisms in the device when removing his properly acquired roll of coins.

A further preferred embodiment provides for a pusher disposed above the dispensing drum to push objects seating at the dispensing drum away from the dispensing drum. The pusher projects into the storage magazine located above the dispensing drum by an amount which depends on the diameter and size of the objects being dispensed to push the objects located therein away from the dispensing drum. The pusher is preferentially coupled in a movable fashion to the dispensing drum.

This has the advantage of providing sufficient space for large objects which need more room to roll into the recess in the dispensing drum. For smaller objects, the pusher is somewhat smaller, which leads to a more homogeneous motion for the objects. In both cases the lifting of the objects seating on the dispensing drum leads to a less damaging processing of these objects.

A particularly preferred embodiment is characterized in that the storage magazine has a sideward sliding door which can be pulled-out in a forward direction. This sideward sliding door can be pulled-out in a forward direction for purposes of filling as can, preferentially, the entire device. The sliding door is borne on a pull-out rail. In this manner filling of the storage volume with objects can be undertaken with the device being pulled out in a forward direction and the sliding door pushed out towards the front. This facilitates the introduction of new objects into the storage magazine as well as the rapid repair of small break-downs due to improved accessibility.

Further load-relief of the dispensing drum is achieved in that the storage magazine is subdivided into two storage regions by means of a stop plate partially projecting into the storage magazine from an upward position. Both storage regions are filled-up with objects below the lower edge of the stop plate, whereas only one volume is filled with objects above this edge. The dispensing drum is preferentially disposed in the partially filled storage region so that only the weight of the objects located in this storage region load the dispensing drum. Sliding of the objects from one storage region into the other guarantees that the dispensing drum is always supplied with at least one object.

In a particularly preferred embodiment, an insert is disposed in the at least one recess which is adapted to the shape and size of the objects to be received. For example, an angled insert member can be introduced into the recess of the dispensing drum which is adapted to a diameter of the objects to be dispensed and which extends the profile of the teeth. This guarantees a gentle handling of the objects which roll on the dispensing drum or on additional objects during the dispensing motion. This is of particular importance when dealing with rolls of coins, which are usually wrapped in paper.

A machine (or apparatus) is particularly preferred comprising a plurality of mutually adjacent dispensing devices. The objects coming from the plurality of dispensing devices are preferentially dispensed into a common removal tray.

Further advantages of the invention can be derived from the description and the drawing. The above mentioned features and those to be further described below can be utilized in accordance with the invention individually or collectively in arbitrary combination. The embodiment shown and described is not to be considered an exhaustive enumeration, rather has exemplary character only for illustration of the invention.

The invention is represented in the drawing and will be explained further in the following description. The figures show an embodiment of an object in accordance with the invention in a highly schematic fashion and are not necessarily to be taken to scale.

DESCRIPTION OF THE PREFERRED EMBODIMENT

Figure 1:
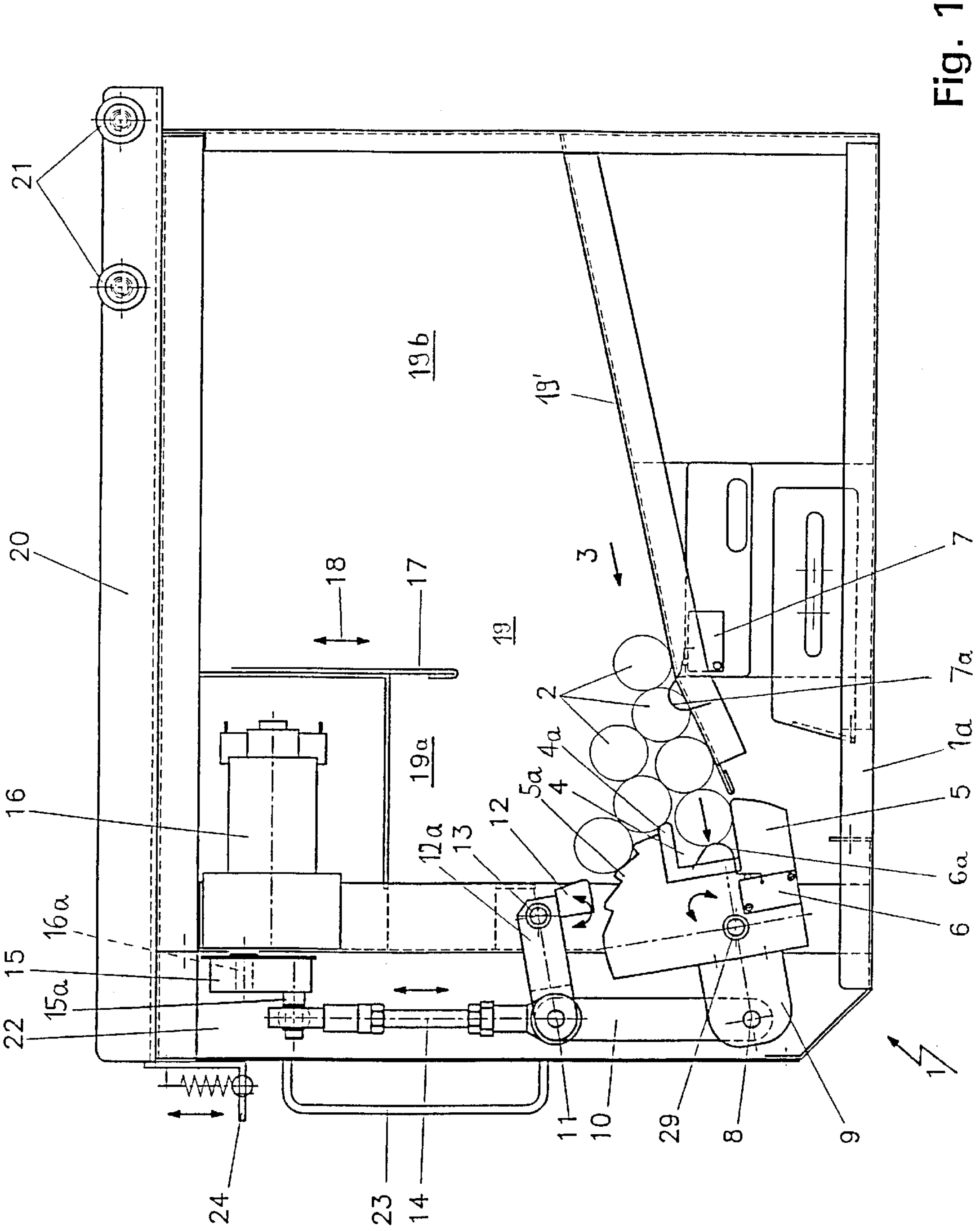
FIG. 1 shows a cross-section through a device for the dispensing of rolls of coins in its neutral position.

FIG. 1 shows a device for the dispensing of cylindrical objects designated in its entirety with 1, e.g. rolls of coins 2, with a storage magazine 19, a dispensing opening 1*a* and a dispensing device configured as a dispensing drum 5. The storage magazine 19 is subdivided into substantially two storage regions 19*a* and 19*b* means of a stop plate 17 whose height is preferentially displaced in the direction of arrow 18. The storage magazine 19 has a floor 19' slanted towards the dispensing drum 5 to guarantee supply of the rolls of coins 2 in a direction towards the dispensing drum 5.

The dispensing drum 5 is disposed near a lower edge of the storage magazine 19 in such a fashion that its axis 29 is substantially parallel to the axis of the rolls of coins 2. FIG. 1 shows the dispensing drum 5 in its neutral position with which recess 4, provided in its periphery and extending parallel to the axis 29, is disposed in such a fashion that one of the rolls of coins 2 can slide out of the storage magazine 19 into the recess 4. An insert 4*a* is provided in the recess 4 to limit the size of the recess 4 to the size, i.e. to the diameter, of the roll of coins 2 which is to be accepted. In the neutral position of FIG. 1, the recess 4 is located above the axis 29 so that one of the rolls of coins 2 automatically slides under the influence of gravity into the recess 4 and the other rolls of coins 2 located in the storage magazine 19 move forward in the direction of arrow 3.

A pivotable pusher 12 is located above the dispensing drum 5 and is secured to a shaft 13 and connected to a connecting rod 14 by means of an axle bolt 11 via a steerer 12*a*. In the position shown in FIG. 1, the pusher 12 pushes a portion of the rolls of coins 2 away from the upper region of the dispensing drum 5, to relieve the dispensing drum 5 from the weight of these rolls of coins 2. In addition, this pushing-away results in a loosening of the rolls of coins 2 lying on top of each other.

The dispensing drum 5 has teeth Sa above its recess 4 which push away a roll of coins 2 seated at the dispensing drum 5. The teeth or the edges of the teeth 5*a* extend along the entire axial length of the dispensing drum 5 parallel to the drum axis 29. These teeth 5*a* cause the rolls of coins 2 which are to be dispensed to be in a state of motion, particularly during the dispensing process so that passage of the rolls of coins 2 from the storage magazine 19 into the dispensing drum 5 is substantially simplified.

The activator 6*a* of a microswitch 6 projects into the recess 4. When the dispensing drum 5 is set into oscillation, a roll of coins 2 gains entrance to the recess 4 and operates the microswitch 6. An activator 7*a* of a microswitch (empty switch) 7 projects past the floor 19' of the storage magazine 19 slanted towards the dispensing drum 5. The roll of coins 2 which is to be dispensed or another one rolls over and activates the neutral switch 7 along its path to the dispensing drum 5.

Figure 4:
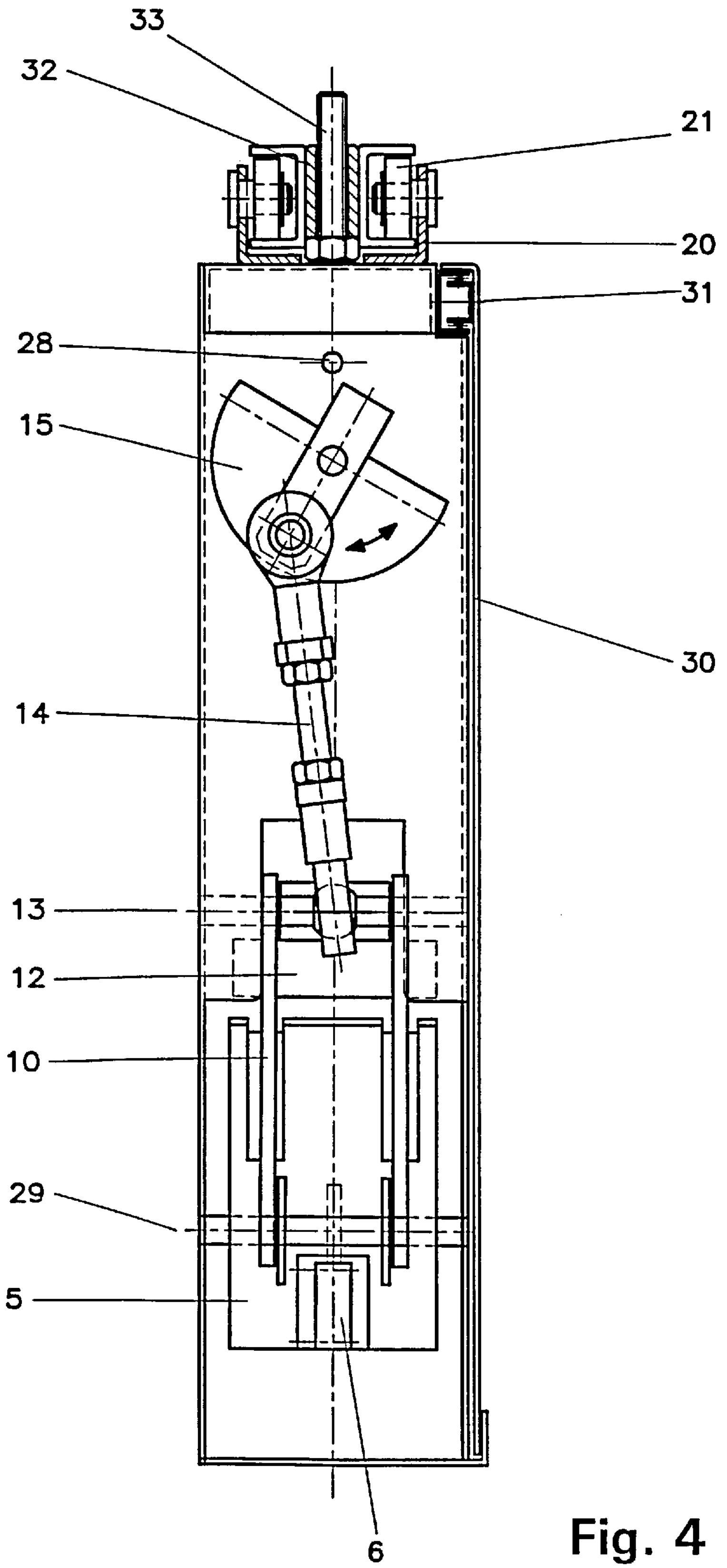
FIG. 4 shows a front view of the dispensing device in accordance with FIG. 1 illustrating its functional components.

The dispensing drum 5 is, as shown in FIGS. 1 and 4, driven by a DC motor 16 disposed in the upper region of the device 1. Cam lever 15 is disposed on the drive shaft 16*a* of the DC motor 16 and supports an axle bolt 15*a* disposed eccentrically with respect to the drive shaft 16*a*. This axle bolt 15*a* is attached to the upper end of the connecting rod 14 the lower end of which is attached to the radial extension 9 of the dispensing drum 5 by means of a connecting rod 10 connected via an axle bolt 8. The steerer 12*a* for the pusher 12 is also joined to the connecting rod 10 via axle bolt 11, and the entire drive mechanism is covered by cover 22.

The dispensing device 1 can be pulled-out via a pull-out carrier 20 disposed on the upper side of the dispensing device 1 (FIG. 1) and borne in ball bearing 21.

Figure 2:
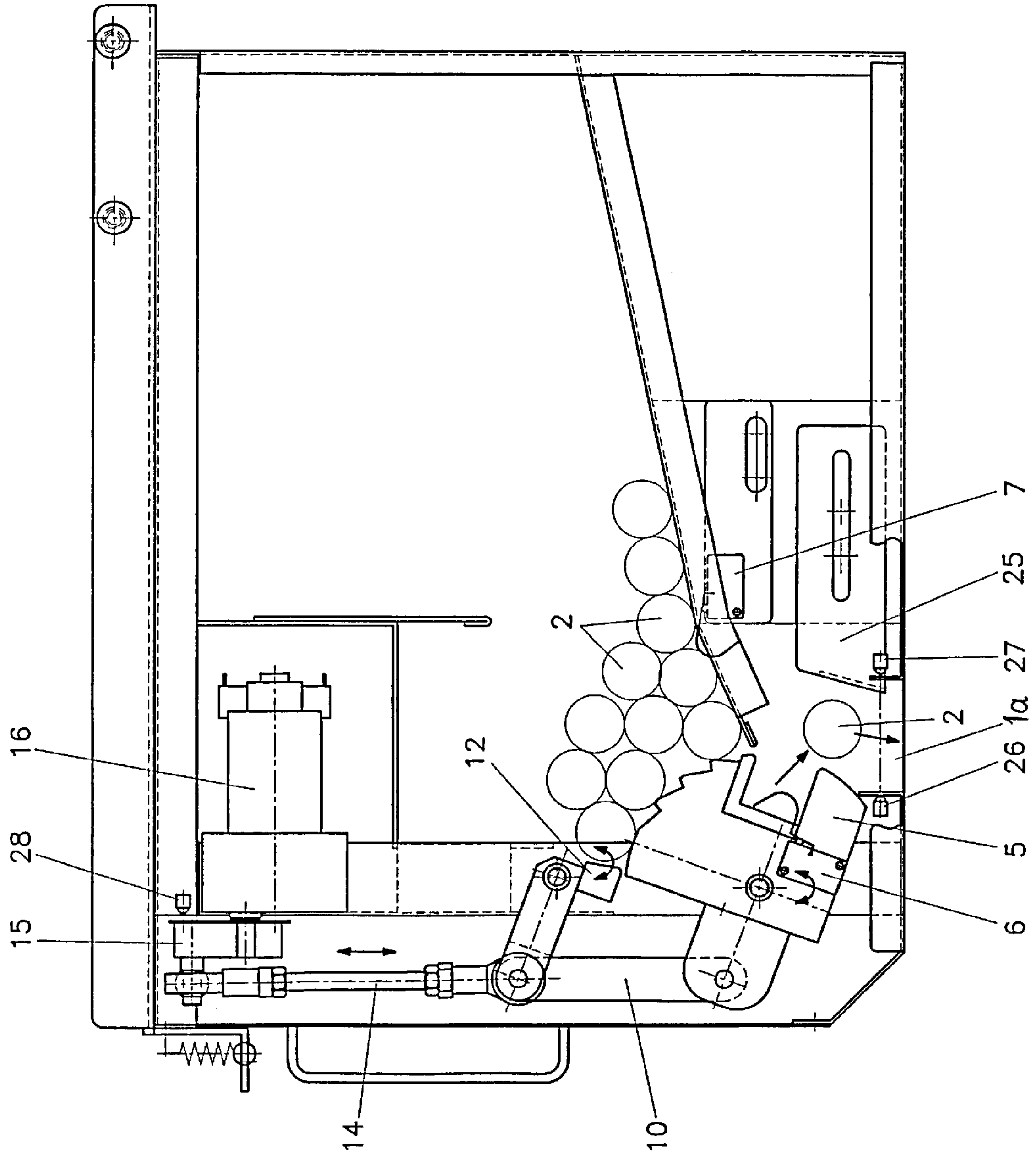
FIG. 2 shows the dispensing device in accordance with FIG. 1 in a position in which the roll of coins is dispensed.

In a position of the dispensing drum 5 shown in FIG. 2, the recess 4 is located below the axis 29 so that the roll of coins 2 located in the recess 4 automatically falls out of the recess 4 under the influence of gravity and is dispensed in a downward direction through the dispensing opening 1*a*. Following this dispensing step, the dispensing drum 5 is pivoted back into the position shown in FIG. 1 so that the now empty recess 4 once more addresses storage magazine 19 to once more be able to accept a roll of coins 2. During this pivoting back of the dispensing drum 5, the pusher 12 also simultaneously pivots into the position shown in FIG. 1 via the connecting rod 14 and the steerer 12*a* so that the roll of coins 2 seating on the dispensing drum 5 is lifted by the pusher 12 and the teeth 5*a* of the dispensing drum 5. This lifting relieves the dispensing drum 5 and simultaneously protects the rolls of coins 2 from excessive friction and the like. After the dispensing drum 5 has accepted an additional roll of coins 2, the dispensing procedure is repeated. This oscillating motion of the dispensing drum 5 between the positions shown in FIGS. 1 and 2 is produced by the upward and downward motion of the connecting rod 14 which, for its part, is driven via the cam lever 15. The DC motor 16 is advantageously controlled in such a fashion that it can be operated in both the forward and backward directions. If the roll of coins 2 is in danger of becoming jammed, the motional direction of the dispensing drum 5 can be reversed to once more loosen the rolls of coins 2.

A light barrier 26, 27 is located within the dispensing device 1 below the dispensing drum 5. This light barrier can confirm the signal of microswitch 6 in the recess 4 of the dispensing drum 5, recognize a piling-up of unremoved rolls of coins 2, and quickly recognize and signal unauthorized intervention from the outside. A dispensing guide plate 25 protects this light barrier 26 and 27 from being damaged and directs the dispensing rolls of coins 2 towards the dispensing opening 1*a*.

The instantaneous position of the dispensing drum 5 is observed via optical sensor 28 which can monitor the instantaneous position of a sensor plate attached to cam lever 15. The microswitch 6, whose activator 6*a* projects into the recess 4, signals the departure of a roll of coins 2 located therein toward the dispensing opening 1*a* as soon as same leaves the recess 4 during downward motion of the dispensing drum 5. The dispensing drum 5 can then be pivoted again in the upward direction without substantial delay to accept a new roll of coins 2.

Figure 3:
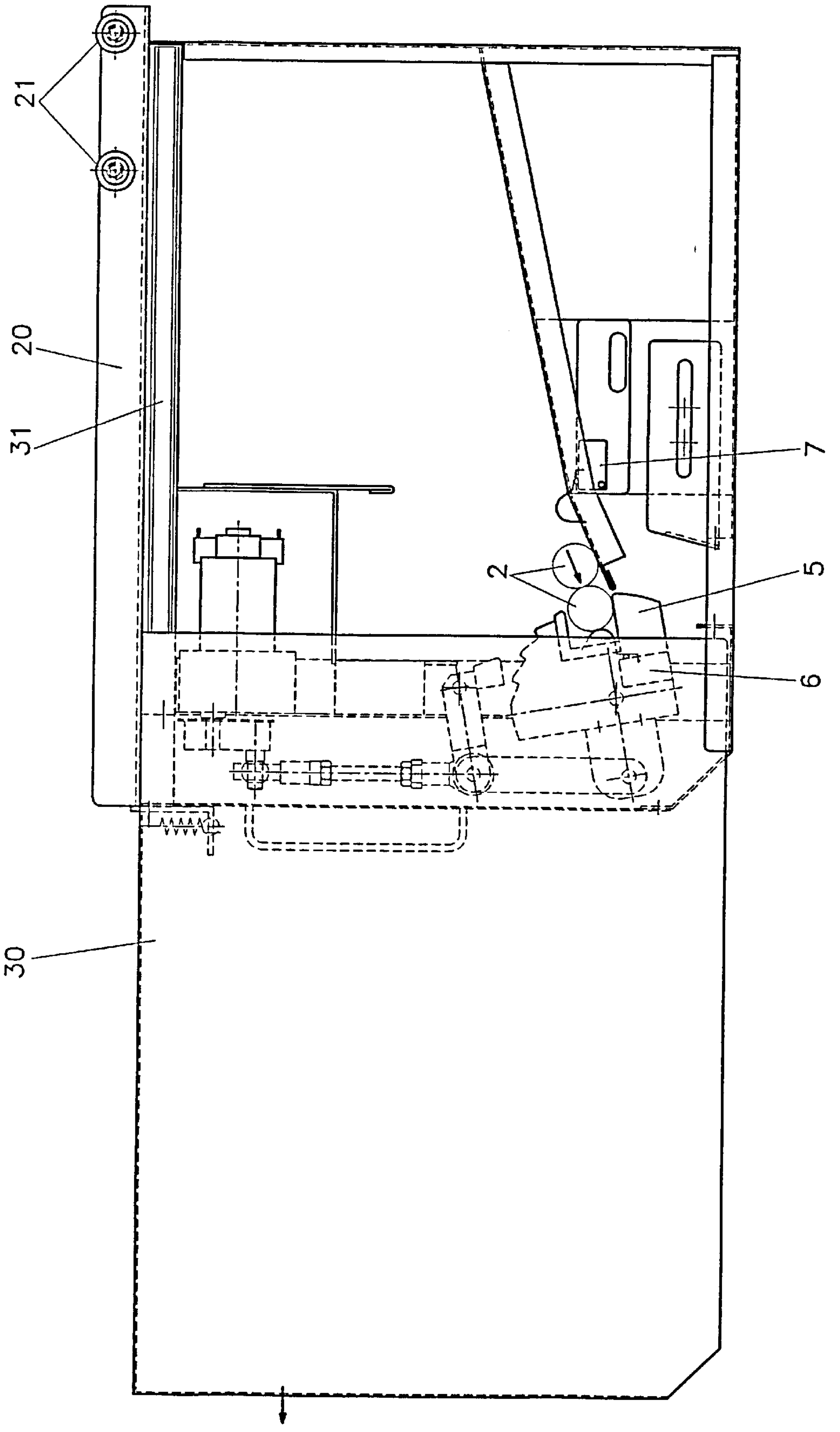
FIG. 3 shows the dispensing device in accordance with FIG. 1 in a state in which it is prepared for filling.

FIGS. 3 and 4 show that the lengthwise side of the device 1 at the right in FIG. 4 is closed by a sliding door 30 borne in a displaceable fashion via a pull-out rail 31. Pushing back this sliding door 30, as is particularly clear in FIG. 8, permits sideward access to the storage magazine 19 for easy filling of same. In addition, repairs and maintenance work can be easily carried out on the individual components of the device 1. In particular, e.g. exchange of the insert 4*a* can be easily carried out to reconfigure the device 1 for differing rolls of coins 2.

Figure 5:
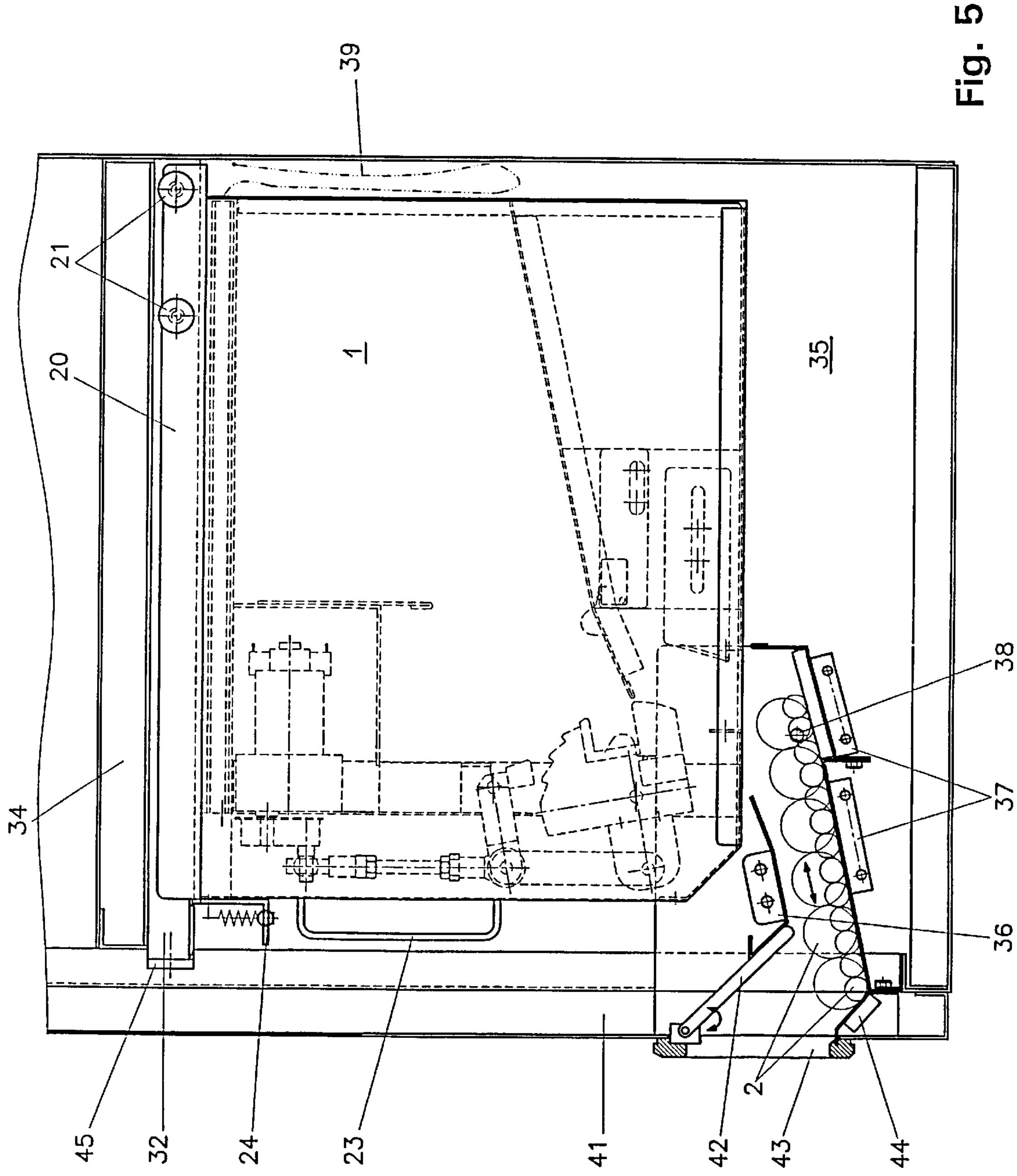
FIG. 5 shows a cross-section through a machine for dispensing rolls of coins which can be filled from the front and in which the device in accordance with FIG. 1 is accommodated.

FIG. 5 shows the dispensing device 1 disposed within a machine housing 35. A removal frame 43 is disposed on the front side of the machine door 41 in which a transparent removal flap 42 is borne. This transparent flap 42 indicates to the customer or to a person filling the device whether or not one or a plurality of rolls of coins 2 are located in the removal tray 37, 44. Access to rolls of coins 2 causes the removal flap 37, 44 to abut on an access blocker 36. In this manner access is only possible to the roll of coins 2 offered and not to the device 1 or to other components within the machine housing 35.

The removal tray 37, 44 comprises a stationary component 37 and a component 44 pivotable with the machine door 41. Pivoting out of the machine door 41 results in one part 37 of the removal tray remaining in the machine housing 35, whereas the other component 44 swings away along with the opened machine door 41.

A light barrier 38 is disposed above the removal tray 37, 44 having the dispensed rolls of coins 2 and illuminates the removal tray along its entire width so that unauthorized access can be recognized.

A handle 23 is disposed at the front side of the device 1 on the cover 22 for the drive elements 10, 14, 15 and 16. The device 1, guided via the pull-out rails 32, pull-out carrier 20 and ball bearing 21, can easily be pulled-out of the machine housing 35 in the forward direction using this handle 23. Extraction is limited by a stop 45 on the machine housing 35 and is not hindered by an appropriately long electrical power cable 39.

The device 1 is located within the closed machine housing 35 in its neutral position (FIG. 5). The device is secured therein by a spring-loaded catch 24 which is likewise mounted to the cover 22 and which engages into a groove in the pull-out rail 32.

Figure 6:
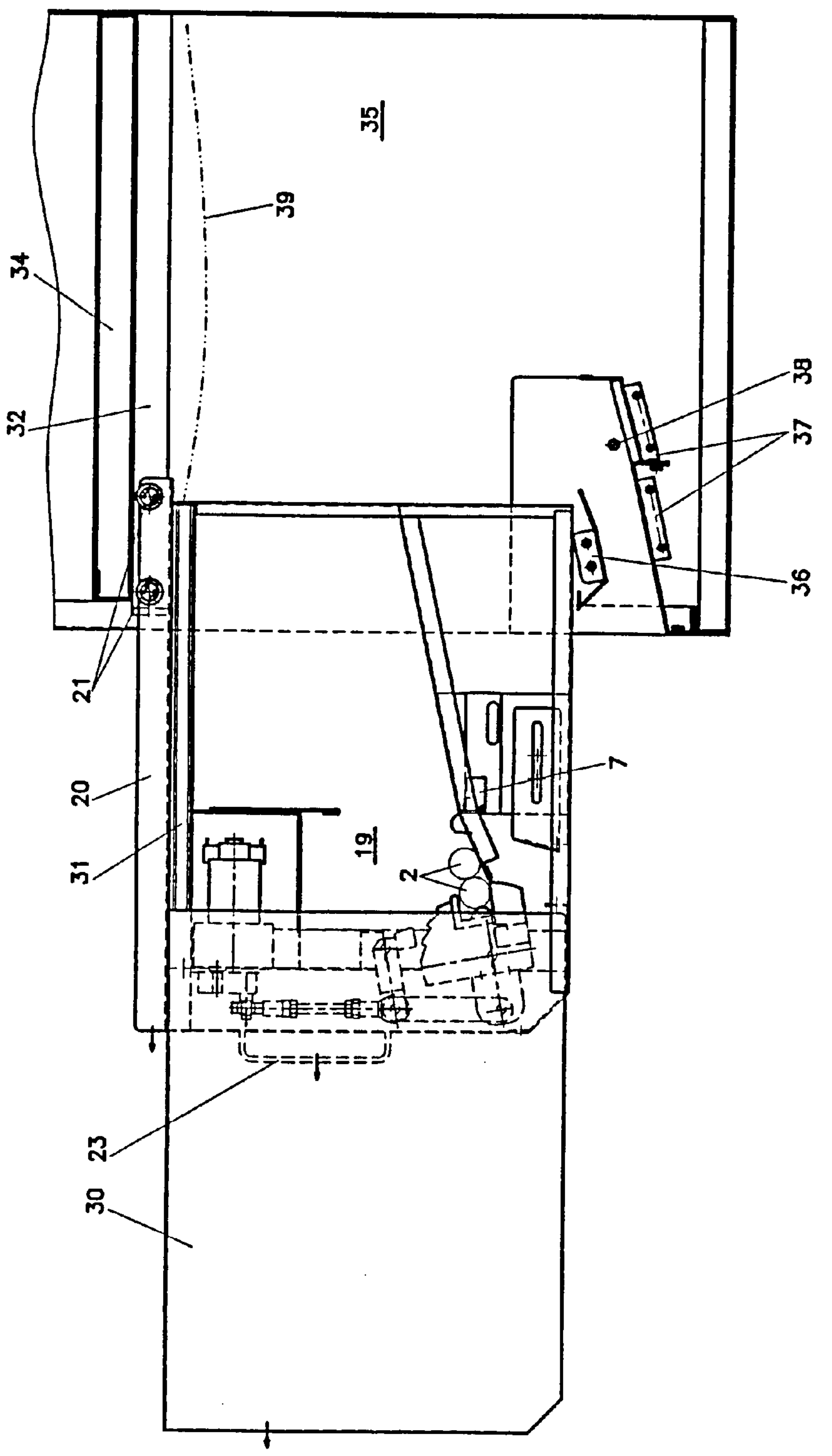
FIG. 6 shows a cross-section through the machine for the dispensing rolls of coins in accordance with FIG. 5 with a device being pulled-out in a forward direction for filling.

As shown in FIGS. 4 and 6, the pull-out rail 32 is attached to an intermediate floor 34 of the machine housing 35 by means of screws 33 and can be pulled in a forward direction out of the housing 35 to fill or service the dispensing device 1.

Figure 7:
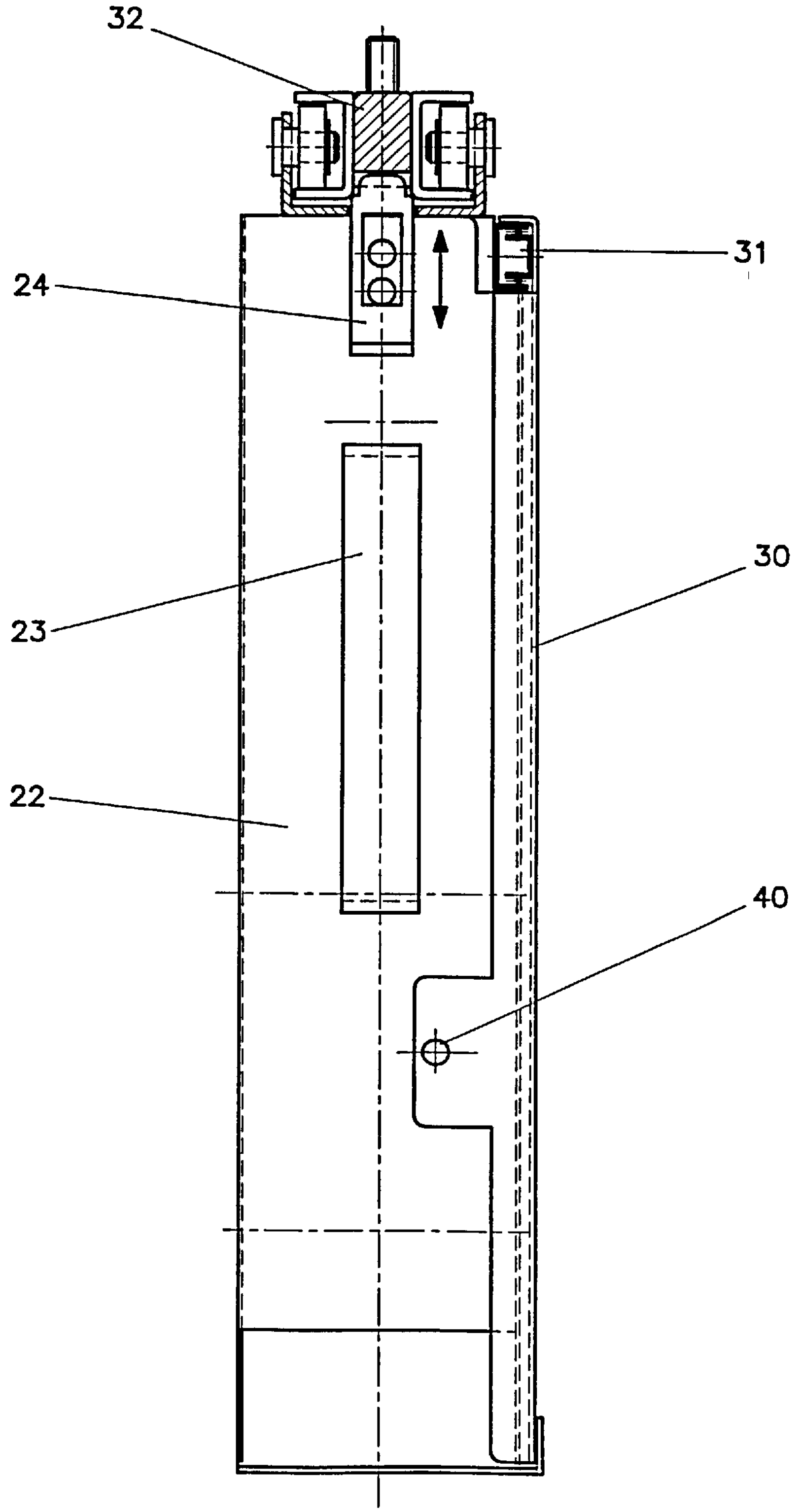
FIG. 7 shows a front view of the dispensing device in accordance with FIG. 4

FIG. 7 clearly shows the catch 24 for the dispensing device 1 within the machine housing 35 and the catch 40 for the closed sliding door 30.

Figure 8:
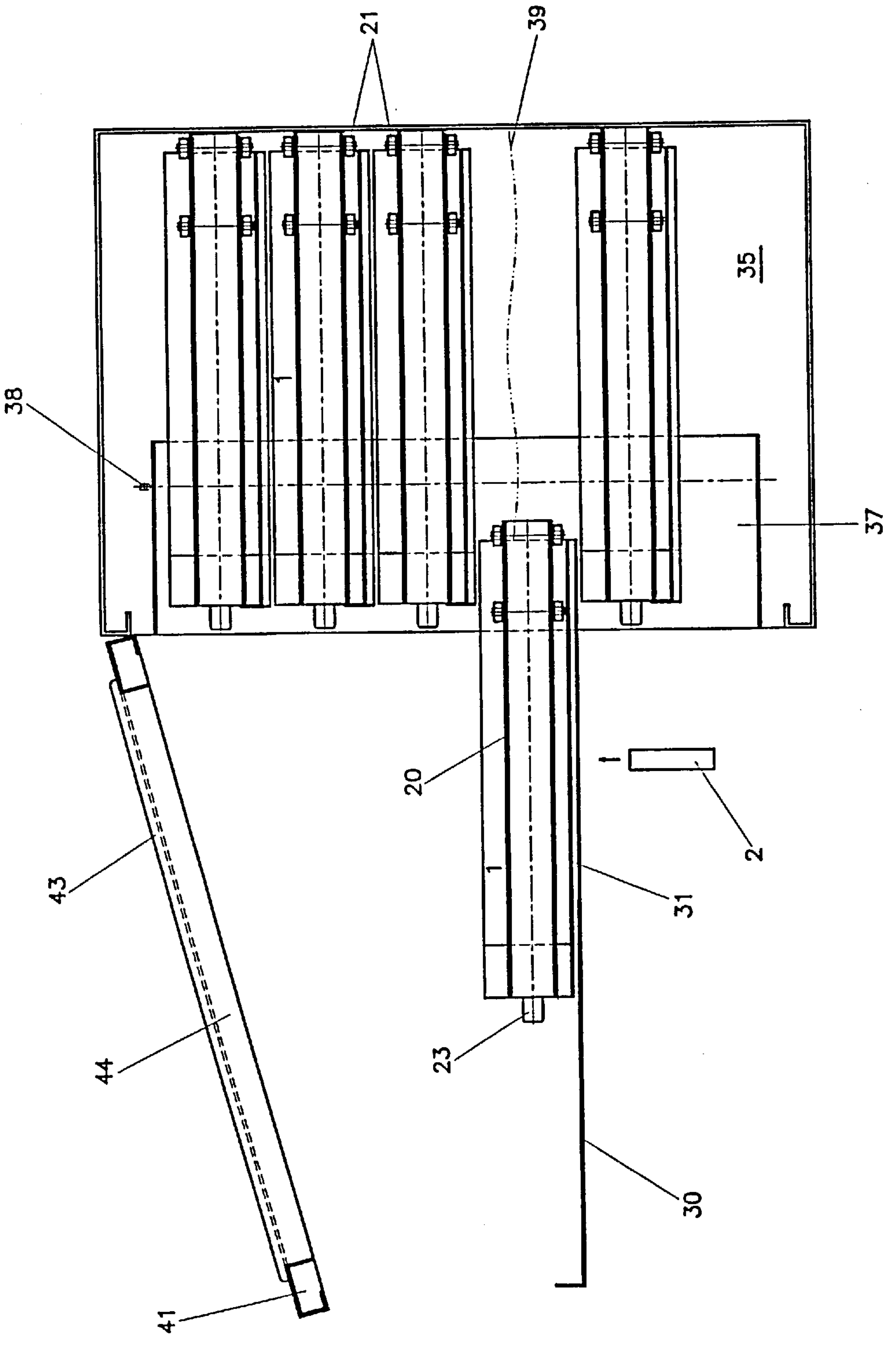
FIG. 8 shows a plan view of a cut through a machine for the dispensing of rolls of coins which can be filled from the front and in which a plurality of devices in accordance with FIG. 1 are accommodated.

FIG. 8 shows five dispensing devices 1 disposed adjacent to each other within a machine housing 35. These dispensing devices can be filled with rolls of coins of different sizes and can dispense them into a common removal tray 37, 44.

I claim:

1. An apparatus for dispensing cylindrical objects, the apparatus having a dispensing device comprising:

a device housing having a dispensing opening;

a storage magazine disposed within said device housing for storing the objects; and a dispensing drum rotatably borne in said device housing and having a recess for accepting the objects, said recess communicating with said storage magazine and said dispensing opening, said drum having an axis of rotation substantially parallel to longitudinal axis of said objects, said drum also having teeth disposed above said recess to push objects seating on said drum away from said drum, said teeth disposed to contact objects in said magazine when said recess is positioned to accept an object for dispensing.

2. The apparatus of claim 1, wherein said teeth extend along an entire axial length of said dispensing drum parallel to said axis of rotation.

3. The apparatus of claims 1, wherein said dispensing device further comprises sensor means for determining if at least one of said storage magazine and said recess is filled.

4. The apparatus of claim 3, wherein said sensor means comprises a first sensor having a microswitch activator projecting into said recess.

5. The apparatus of claim 3, wherein said storage magazine comprises a floor, slanting downward towards said dispensing drum and said sensor means comprises a second sensor having a microswitch activator projecting above said floor of said storage magazine.

6. The apparatus of claim 1, wherein said apparatus comprises an apparatus housing having a front-sided apparatus door and said dispensing device further comprises a pull-out support having stationary pull-out rails mounted to said apparatus housing at an upper-side of said device housing for pulling said dispensing device out of said apparatus housing through said apparatus door.

7. The apparatus of claim 6, wherein said apparatus housing further comprises a removal tray for accepting said dispensed objects, said removal tray comprising a stationary part mounted to said apparatus housing and a pivotable part mounted to said apparatus door.

8. The apparatus of claim 7, further comprising a fourth sensor mounted to said apparatus housing above said stationary removal tray part.

9. The apparatus of claim 7, further comprising an access blocker mounted to said apparatus housing above said stationary removal tray part.

10. The apparatus of claim 1, wherein said dispensing device further comprises a third sensor disposed between said dispensing drum and said dispensing opening for detecting dispensing of said objects through said dispensing opening.

11. The apparatus of claim 1, wherein said dispensing device further comprises a pusher disposed in a region above said dispensing drum to push said objects seating on said dispensing drum away from said dispensing drum.

12. The apparatus of claim 11, wherein said pusher is connected to said dispensing drum in a movable fashion.

13. The apparatus of claim 1, wherein said device housing comprises a sideward sliding door which can be pulled out in a forward direction for accessing said storage magazine.

14. The apparatus of claim 1, wherein said storage magazine comprises a stop plate projecting partially into said storage magazine from an upward direction to subdivide said storage magazine into two storage regions.

15. The apparatus of claim 1, wherein said dispensing device further comprises an insert adapted to a shape and size of said objects being dispensed, said insert disposed in said recess.

16. The apparatus of claim 1, further comprising a plurality of adjacently disposed dispensing devices.

* * * * *